United States Patent Office 3,397,189
Patented Aug. 13, 1968

3,397,189
POLYMERIC SULFIDES
John G. Erickson, Stillwater, Minn., assignor to Minnesota Mining and Manufacturing Company, St. Paul, Minn., a corporation of Delaware
No Drawing. Continuation-in-part of applications Ser. No. 343,142 and Ser. No. 343,147, Feb. 6, 1964. This application June 7, 1967, Ser. No. 644,076
7 Claims. (Cl. 260—79)

ABSTRACT OF THE DISCLOSURE

Novel vinyl- or sulfhydryl-terminated polymers capable of chain extension or other reaction to give block copolymers are provided having pluralities of ester groups and hetero atoms in the back-bone chain. At least some of the hetero atoms are sulfur.

---

This application is a continuation-in-part of copending applications S.N. 343,142 and S.N. 343,147 both filed Feb. 6, 1964, as continuations-in-part of application S.N. 779,846, filed Dec. 12, 1958, and all of which are now abandoned, and of copending application S.N. 509,456, filed Sept. 22, 1965, as a division from S.N. 357,812, now U.S. Patent 3,278,352, also a continuation-in-part of said S.N. 779,846.

This invention relates to polymers and particularly to certain new heterogeneous addition thiapolyesters.

The formation of polymers in which atoms other than carbon, so-called hetero-atoms, are included in the polymer chain is a matter which has attracted many workers in the broad field of polymer chemistry. Reactions which have been employed include condensation reactions of monomers having sulfur atoms in the chain, such as thiodipropionic acid, and condensation reactions of alkali metal polysulfides with dihalo compounds. By these methods numerous polymers have been prepared but drawbacks, such as the occurrence of degradation reactions, have been encountered. The inclusion of sulfur atoms in side chains of polymers has also been found to offer certain advantages in other cases. The interreaction in the presence of strong bases, such as alkali metals and hydroxides, of compounds containing at least two ethylenic double bonds activated by an adjacent carbonyl group with compounds containing at least two active hydrogen atoms has been disclosed by George E. Hulse in U.S. Patent 2,759,913. In this instance the active hydrogen compounds may include oxygen, sulfur and nitrogen as hetero atoms. In all instances, however, so far as is known, it appears that heretofore only by condensation processes have polymers been produced which have had terminal end groups which afford the possibility of chain extension.

It is an object of this invention to provide linear viable thiapolymers terminated exclusively by vinyl or sulfhydryl groups. It is another object of the invention to provide prepolymers containing sulfur atoms in the chain which are useful for the production of polymers by chain extension involving addition, as well as for similar use in block polymerization.

Other objects will be apparent from the disclosure hereinafter.

In accordance with the above and other objects of the invention it has been discovered that when reactants of certain types are employed in non-stoichiometric proportions under conditions which are significantly less basic than those described by Hulse, substantially linear viable sulfur-containing polymers are obtained having desirable reactivity. One reactant is an acrylate ester e.g. di- or tri-acrylate or di- or tri-methacrylate. In general only a small part of the acrylate ester is other than a di-ester, that is a tri-ester. The other reactant is a thiol- or sulfhydryl group-containing compound in which at least two available hydrogen atoms are attached to sulfur. Such sulfhydryl group-containing compounds are conveniently referred to as disulfhydryl group-containing compounds, although for some purposes three or more of such groups may be present, and it will be understood that the term includes hydrogen sulfide.

The thiapolymer chain is formed from an alternating sequence of the two reactants as the result of successively alternating addition reactions and the term heteropolymerization is therefore employed herein as being most aptly descriptive of this reaction. The term "thiapolyester" is employed for the new polymers of the invention and will be understood to be generic to the more specific terms used herein and is intended to indicate the presence of "thia" groups, that is methylene groups formally replaced by divalent sulfur in the prepolymer chains.

The viable thiapolyesters of the invention have molecular weights of from less than about 2,000 to about 100,000 or even as high as 1,000,000, depending upon the conditions employed and the particular characteristics of the sulfhydryl group-containing component and of the unsaturated component. In a broad general way such molecules might be referred to in the usual sense as polymers, but the compositions of the present invention appear to be distinctive amongst all known sulfur-containing polymers in that the chains are terminated exclusively by sulfhydryl or vinyl groups which are readily capable of undergoing further reaction or chain extension to give higher molecular weight prepolymers.

So far as is known under the instant polymerization conditions, as long as neither an initiator nor a chain stopper is added, the reaction does not cease of itself unless reactants are exhausted, although it may become slower in rate. This behavior is contradistinctive to that of known systems, where the reaction terminates spontaneously even though no chain stopper be added. Under the conditions described particularly by Hulse in the above-cited patent, strong alkalies are employed which may effectively cap the polymer molecules by saponification of ester groups and may further initiate other types of polymerization of the acrylate groups thereby also altering the course of the reaction. Accordingly, the term "viable" is properly employed in distinguishing the thiapolyesters of the invention, even when these reach extremely high molecular weights.

The lower molecular weight viable thiapolyesters of the present invention having molecular weights from about 2,000 to about 50,000 are particularly useful in the formation of block copolymers by reaction with other molecular species, or for curing with curing agents as set forth hereinafter, and they may therefore also be regarded as prepolymers. The compositions of the invention are generically designated by the term thiapolymers whether terminated by sulfhydryl groups or unsaturated groups.

The new thiapolymers of this invention consist of an alternating sequence of residues of activated vinyl group-containing compounds and dithiols. As will become evident hereinafter the desired predetermined terminal group on the polymer chain is readily obtained by employing a slight but definite excess over stoichiometric of the particular monomer.

Broadly speaking, the vinyl group-containing reactants useful in the process of the invention are acrylate esters represented by the formula:

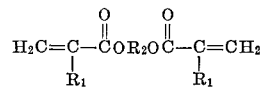

wherein $R_1$ represents a member of the group consisting of hydrogen and methyl radicals, and $R_2$ represents a member of the group consisting of divalent cycloalkylene arylene and oxalkylene radicals.

Illustrative substituents or $R_2$ are illustrated by cycloalkylene radicals of 6 to 8 carbon atoms such as 1,4-hexahydrophenylene, hexahydroparaxylylene, hexahydrometaxylylene; arylene radicals of 6 to 10 carbon atoms such as phenylene, toluylene, dimethylphenylene, naphthylene and the like including aralkylene radicals such as p-xylylene and the like.

Oxaalkylene radicals are derived from polyoxyalkylene glycols having molecular weights or gram-equivalent weights from about 150 up to about 40,000 and even more. The radicals in which ratios of carbon to oxygen are from 2:1 up to 4:1 have molecular weights of about 100 to 2,500. Some such polyoxyalkylene glycols include dissimilar alkylene oxide groups so that ratios are not necessarily integral. Such glycols are well-known to be available commercially and are readily converted to acrylates or methacrylates for use in preparing compositions of the invention. A preferred class are oxaalkylene radicals containing from 4 to 50 carbon atoms and 1 to 24 oxygen atoms, i.e., having molecular weights from about 100 to about 1,100. A still more preferred group is those having molecular weights from about 150 to about 1,000; illustrated by the radicals from polyethylene glycols such as tetraethylene glycol and other commercially available glycols having molecular weights in that range. The oxaalkylene radicals are especially preferred, moreover, because of the hydrophilicity they confer on prepolymers. Hydrophilicity is decreased by increasing the carbon to oxygen ratio in the prepolymer molecule.

These terminal carbonyl-activated vinyl group-containing organic compounds are more specifically illustrated by the following representative compounds: glyceryl diacrylate, 1,4-trans-bis(hydroxy-methyl)-cyclohexane diacrylate, polybutylene glycol diacrylate, tetraethylene glycol dimethacrylate, hydroquinone diacrylate, p-xylylene diacrylate, and the like. The term acrylate-component is employed to include both acrylate and methacrylate esters as illustrated above.

The disulfhydryl group-containing reactants which are useful in the process of the invention can be represented by the formula:

$$HS(R_3S)_nH$$

wherein $n$ is a number chosen from the group consisting of zero and 1, and $R_3$ is a stable divalent organic radical which is free from oxidizing groups and substituents which contain active hydrogen atoms, and includes such radicals as alkylene, arylene, aralkylene, diacyloxyalkylene and acylamide radicals, and the like. These disulfhydryl group-containing reactants are more specifically illustrated by the following representative compounds:

hydrogen sulfide,
1,2-ethanedithiol,
1,4-butanedithiol,
1-methyl-butane-1,4-dithiol,
2-methyl-propane-1,3-dithiol,
2-hydroxy-propane1,3-dithiol,
2-methoxypropane-1,3-dithiol,
2-dimethylamino-propane-1,3-dithiol,
2,2-dithiol-diethyl ether,
ethylene glycol dithioglycolate,
diethylene glycol-1,2-bisthioglycolate,
1,2-bis-thioglycolamidoethane,
1,3-dimercaptobenzene,
toluene 3,4-dithiol,
naphthalene-1,4-dithiol,
1,4-bis(mercaptomethyl)benzene,
4-mercapto-benzylmercaptan,
3,5-dimercaptochlorobenzene,
3,5-dimercaptopyridine, N,N-bis(3-mercaptopropyl)-N,N'-dimethyl-phenylenediamine,
3,3-dimercaptodipropyl sulfone,
1,7-dimercaptoheptan-4-one,
4,4-diethoxy-heptane-1,7-dithiol,
1,6-dimercapto-heptyne-3,
1,6-dimercaptoheptene-3,
3-chloro-1,6-dimercaptoheptane-3, and
the like.

As noted, the disulfhydryl group-containing reactant must be free from oxidizing and active hydrogen-containing substituents other than the two sulfhydryl groups. The undesirable substituents include nitro groups, primary and secondary amino groups, active methylene groups, and sulfoxide, amidine, carboxyl, oximino, hydroxylamino and sulfonic acid groups and the like.

Since the acrylate-component contains two double bonds, and the sulfhydryl group-containing component contains two thiol groups, the resultant viable thiopolymers are linear. Depending upon the stoichiometry under which they are prepared, the linear prepolymers are characterized by functional sulfhydryl or vinyl terminal groups. These thiapolyesters are useful in the preparation of higher molecular weight prepolymers and cured, rubbery polymers.

It has been found that poly(p-xylylene thiodipropionate) is a useful and valuable polymer having the unusual properties of being a rubbery solid even when not cured. This is most remarkable in a polymer derived from an acrylate ester. It is a substantially linear polymer produced by the addition of hydrogen sulfide to p-xylylene acrylate as shown by the equation:

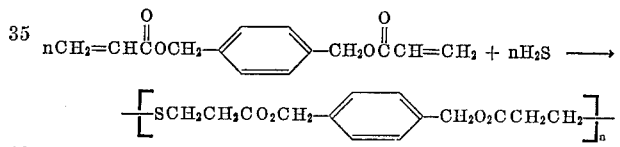

This equation, which is illustrative, shows the reaction proceeding with an equimolar ratio of hydrogen sulfide and the diester and neglects the nature of the end groups. In producing polymers of the invention a slight excess, up to about 5 mole percent over stoichiometric, of one reactant or the other is employed. When the hydrogen sulfide is in slight excess over stoichiometric, the resulting polymer has mercapto or sulfhydryl end groups. When the diacrylate is employed in slight excess over stoichiometric, the resulting polymer is terminated by vinyl groups.

While substantially linear prepolymers are usually prepared by such processes it is advantageous in certain instances to provide substantially linear prepolymers having an amount of branching, so that some cross-linking can be provided in the cured polymer. This is readily accomplished during the process of the invention by including in the reaction mixture a minor amount of an at least trifunctional starting material similar to the type used herein, i.e. either sulfhydryl or vinyl group-containing starting materials which is insufficient to effect curing of the prepolymer. When such polyfunctional materials are incorporated into the polymerization reaction mixture, they provide some cross-linking sites in the prepolymer molecules. Such polyfunctional thiapolyesters are also included within the scope of the invention. When the polyfunctional materials are included in larger amounts, the cured compositions as described, for example, in U.S. Patent 3,278,352, are obtained. Agents which are effective in the present invention to produce branching include:

Glyceryl triacrylate,
Pentaerythritol triacrylate,
Triacryly-hexahydro-s-triazine,
Triacrylate of trimethylolpropane, 2,4,6-tris(glycidyloxy)-s-triazine,
Trimethacrylate of trimethylolpropane,
Pentaerythritol tetrathioglycolate,
Trithioglycolate of trimethylolpropane.

The above branching agents are employed in amounts such that the prepolymers comprise identical terminal groups and not more than about one crosslinking group or polyvalent node for each ten of the above divalent recurring groups. The branching agents or crosslinking units are similar to the above divalent recurring units except that one $R_2$ is a trivalent or higher valent group having the requisite number of substituents. The formula is then expressed as:

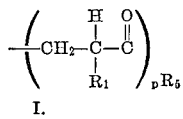

where $p$ is 3 or 4 and $R_5$ is a p-valent organic nucleus. Thus, for example, if a prepolymer is made by reacting hydrogen sulfide and tetraethylene glycol dimethacrylate a number of crosslinking sites may be provided in the prepolymer by including a small amount of one of the above branching agents. It will be seen that certain of these branching agents possess polyvalent aliphatic organic nuclei and three or four acrylyl groups which in their radical form, i.e.

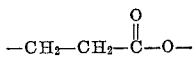

are adapted to forming chemical junctions to sulfur atoms of divalent recurring units of the prepolymer. Others of the branching agents possess other nuclei and groups adapted to forming chemical junctions. Likewise polyvalent organic nuclei substituted by groups possessing terminal sulfur atoms are adapted to forming chemical junctions with recurring units having terminal hydrocarbon groups. This concept will be readily understood by those skilled in the art without the complexity of general formulae showing such crosslinking sites or polyvalent nodes in greater detail.

The effect of the above-described branching agents on prepolymers of higher molecular weight is to render them somewhat less soluble in ordinary organic solvents. It is usually desirable to include relatively small amounts of branching agents which introduce cross-linking sites, of the order of not more than about one such site for every ten monomer units in the polymer chain. It will be evident that by controlling the amount of cross-linking component employed in the process of this invention, the preparation of polymers having variable solubility and other characteristics required for specific purposes is readily achieved.

The thiapolymers of the invention which contain some cross-links still possess chain-extending sulfhydryl or vinyl terminal groups (determined by the proportions of reactants employed as described hereinafter) and are likewise valuable as intermediates for the formation of chain-terminated polymers which may be either relatively thermoplastic elastomeric substances or thermosetting plastics according to the method of chain-termination employed.

The following equations, in which R, $R_1$ and $R_2$ have their above significance and $m$ represents a number having an average value from about 3 to 300 or more, illustrate the manner in which compositions of the invention are obtained having selectively vinyl or sulfhydryl terminal groups.

Equation 1

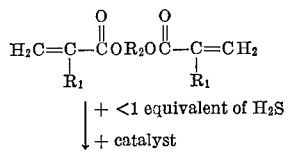

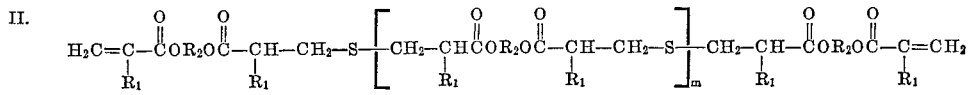

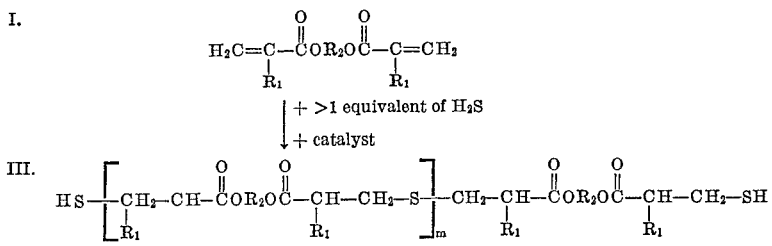

Equation 2

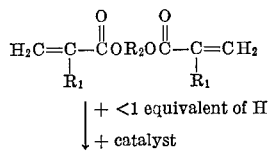

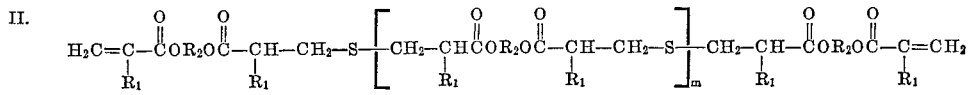

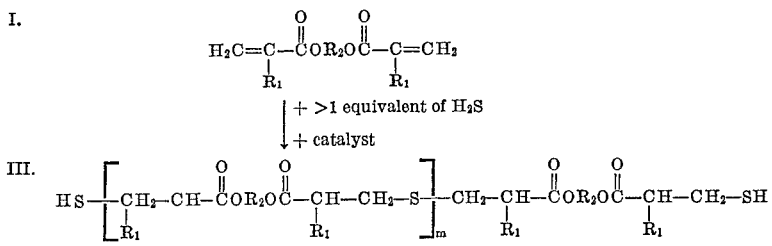

For simplicity of representation in the foregoing equations, hydrogen sulfide has been chosen as the disulfhydryl group-containing reactant, but it will be understood that these equations are also representative of heteropolymerizations employing other sulfhydryl group-containing reactants. In such cases, the character of the terminal groups is controlled similarly by the relative amounts of reactants present, but the sulfur atoms shown are replaced by the disulfhydryl residue —S—$R_3$—S— as described hereinabove. Since the reactions would in this case be very cumbersome to write in detail by equation, they are here omitted.

Referring to the equations, it will be seen that when less than one molar equivalent of hydrogen sulfide is employed the resulting prepolymer is vinyl-terminated (including in this term substituted vinyl groups) and when more than one equivalent is employed, the resulting prepolymer is sulfhydryl-terminated. It will also be apparent that at any given time at which hydrogen sulfide is present, the effective molecular species present will be long-chain dithiols having sulfide and ester groups in the chain, which chain-extend by alternating reaction with available molecules of unsaturated compound and hydrogen sulfide.

Usually vinyl-terminated thiapolymers are found to be colorless whereas sulfhydryl-terminated thiapolymers may vary from almost colorless to pale yellow or brown in color, although removal of impurities can be expected to remove color.

The compositions of this invention are prepared in the presence of certain nitrogenous basic catalysts. The basic catalysts are commonly liquids and may also be used in larger amounts to serve as the solvent or diluent for the reaction. Alternatively, a mutual, inert solvent for the reactants may be employed together with the nitrogenous basic catalyst. Suitable catalysts are basic tertiary amines which contain no active hydrogen, such as the lower aliphatic amines, for example, trimethylamine, triethylamine, tributylamine and the like as well as certain secondary amines in which the remaining hydrogen is sterically hindered so that it is not reactive, as in diisopropyl amine. The amount of nitrogenous basic catalyst employed is dependent upon the strength of the base employed. Bases weaker than pyridine are generally not effective and thus are not ordinarily to be considered as catalysts for the reaction. It is found that the polymerization proceeds at a desirable rate when the amount of catalyst employed is from about 1 percent to 20 percent by weight of the total reaction mixture. Amounts in excess of this serve primarily as solvents or diluents and while they bring about no increases in catalytic effect, they are not harmful to the process.

Solvents which can be used include, for example, benzene, diethyl ether, acetone, dioxane, tertiary butyl alcohol, isopropanol, pyridine, chlorobenzene and the like nonacidic liquids which do not react to form acidic materials under the conditions of reaction.

The polymerization process is carried out under pressure if necessary, at any temperature in the range of about −40° C. to about 250° C. for times from a matter of a few minutes or hours upwards to several days or more, depending upon the chain length which is desired as well as upon the particular reactants, temperatures and other conditions employed. Control of the formation of terminal groups as desired is easily effected, even using hydrogen sulfide gas under ordinary conditions.

The simplest useful disulfhydryl group-containing reactant is hydrogen sulfide. When reacted with bis-unsaturated-esters of diols, hydrogen sulfide provides curable, viable polymers which may be terminated by either sulfhydryl or vinyl groups, as desired, and which are usually oily liquids or tacky semisolids, but which may also be solids. These prepolymers may be termed monothiapolyester, because one thia-type sulfur atom is introduced into the chain for each diester monomer unit. Similarly, when the dithiol-substituted organic reactants are employed, curable prepolymers are formed which may be termed dithiapolyesters. It should be noted, however, that the prefixes "thia" and "dithia" as used herein do not refer to the polysulfide or other sulfur-sulfur linkages heretofore known in the polymer art.

The viable polymers of the invention in which $m$ has average values ranging from small numbers into the hundreds, i.e., from 3 to 300 or more, as estimated from determination of inherent viscosity in suitable solvents, are valuable for their ability to chain-extend and to react with suitable curing agents. Thus, for example, a useful elastomer is produced by reaction of a sulfhydryl-group terminated thiapolymer derived from hydrogen sulfide and the dimethacrylate of tetraethylene glycol with the trimethacrylate of trimethylol propane. Generally speaking, the thiapolyesters and dithiapolyesters of the invention are liquids or low-melting solids.

The curable thiapolyester prepolymers of the present invention are not in any way comparable to the substantially completely crosslinked intractable insoluble polymers known to the art to be obtained by reaction of hydrogen sulfide solely with a tris-unsaturated compound. Such substances are described in Berichte, vol. 81, pp. 527 to 531 (1948). These substances are incapable of chain extension and cannot produce the useful elastomeric compositions which can be made from the polymers of the invention. The curable prepolymers of the present invention are likewise only superficially similar to polyamides or polyesters of the prior art such as these prepared from thiodipropionic acid by condensation methods. These known polymers, as described, for example, in Swiss Patent 317,476 and in United States Letters Patent Numbers 2,158,064, 2,191,556, 2,389,628, 2,534,347, 2,575,196 and the above-noted Hulse Patent Number 2,759,913 contain terminal groups incapable of continuing chain extension. Thus, these sulfur-containing polymers of the prior art are generally unsuitable for further curing or crosslinking reactions, whereas the soluble prepolymers of the present invention selectively and predeterminedly contain sulfhydryl and vinyl terminal groups which are eminently suited for further crosslinking as, for example, in the case of thiapolyesters, for curing to rubbery compositions.

One embodiment of the invention encompases thiacopolyesters in which a minor portion of the $R_2$ groups, then designated $R_4$, is different and is selected from the group of alkylene of 2 to 4 carbon atoms and divalent glyceryl radicals or groups.

The prepolymers of the present invention are further described by the following specific examples which are here given by way of illustration of the best mode contemplated of practicing the invention without the intention of being thereby limited in the scope of the invention. In these examples parts are given by weight and inherent viscosities are determined by conventional procedures using concentrations of approximately 1 gram of polymer in 100 ml. of the specified solvents, unless otherwise indicated.

EXAMPLE 1

A solution of 7.38 parts of p-xylylene glycol diacrylate (available by the process of British Patent 729,028 or from the glycol and acrylyl chloride in chlorobenzene in the presence of triethylamine) and 0.5 part of diisopropylamine in 40 parts of pyridine is treated with hydrogen sulfide gas in small portions until the hydrogen sulfide is no longer consumed and its odor persists. A total of about 1 part of hydrogen sulfide is reacted. Dilution of the reaction mixture with heptane after about 30 hours of reaction precipitates the polymer as a rubbery mass which is swelled by soaking in methylene chloride for about 16 hours. The swollen rubbery polymer is stirred in heptane and washed repeatedly with heptane and dried. The product is a tough, rubbery, yellowish, sulfhydryl-terminated polymer, insoluble in most of the common organic solvents. It is found to have an inherent viscosity of 0.842 in pyridine and of 0.533 in dimethylformamide. The molecular weight estimated from these results is about 80,000 and the polymer chain thus contains about 300 repeating units.

Calculated for $C_{14}H_{16}O_4S$, percent, 60.0, C; 5.8, S; 11.4, S. Found, percent, 59.6, C; 5.7, H; 11.2, S.

The remarkable rubbery properties of this polyester are shown by casting a thin sheet (from pyridine solution) and testing this sheet. It is to be noted that this is an uncured and unfilled rubber and is therefore comparable with a gum stock. It is found to have a tensile strength of 3,940 p.s.i. and elongation at break of 525 percent. Low temperature properties are determined by ASTM methods D–746–55T and D–1053–54T. The $T_{10}$ value is −15° F., $T_B$ is −22° F. X-ray diffraction diagrams at 25° show that the unstretched film is crystalline and becomes highly oriented when stretched. The film swells about 5 percent in 72 hours in a mixture of 70 percent isooctane and 30 percent toluene. By comparison, neoprene gum stock swells and flows in this solvent mixture.

EXAMPLE 2

The above procedure is carried out with 60 parts of p-xylylene glycol diacrylate and 5.0 parts of diisopropylamine in 300 parts of pyridine containing 0.5 part of di-tert-amylhydroquinone (as an inhibitor for free radical polymerization of vinyl compounds), adding hydrogen sulfide so that about 7 to 8 parts is added in about 24 hours. The reaction mixture is then permitted to stand for a further 24 hours and is precipitated and the thiapolymer washed with heptane. It is more soluble than the product of Example 1 and dissolves in methylene chloride, from which it is reprecipitated and dried. It is a light yellow rubbery solid and has an inherent viscosity in pyridine of 0.341. It is vulcanized by heating 100 parts of polymer with 10 parts of magnesium oxide and 5 parts of dicumyl peroxide for 30 minutes at 310° F. under pressure between platens. A snappy rubber is obtained.

Similar results are obtained when triethylamine and other lower aliphatic amines are employed as catalysts in the polymerization reaction.

EXAMPLE 3

By essentially the procedure of Example 1, a series of prepolymers of the invention is prepared employing pyridine as solvent with diisopropylamine as catalyst and hydrogen sulfide as the sulfhydryl component as shown in Table 1 in which the acrylate components are listed by formulae.

hours it absorbs about 12 percent by weight of a 70:30 isooctane-toluene mixture at normal room temperature.

Samples of the thiapolyester having an inherent viscosity of 0.608 are heated at about 385° F. and 350° F. at atmospheric pressure and the loss of weight determined. The results are found to be:

TABLE 2

| Total time of heating (min.) | Total loss of weight (percent) | |
|---|---|---|
| | 385° F. | 350° F. |
| 10 | 0.47 | 0.42 |
| 20 | 0.49 | 0.53 |
| 40 | 0.55 | |
| 60 | 0.63 | 0.53 |
| 1,440 | 25.4 | 5.8 |

TABLE 1

| Acrylate component | Time of Reaction (days) | Termination | Inherent viscosity (solvent) | Properties of prepolymer |
|---|---|---|---|---|
| 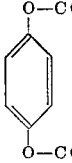 (a) | 2 | —SH | 0.148 (m-cresol) | Light yellow solid, softening ca. 165° C. |
| 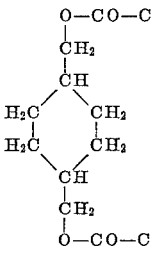 (b) | 7 | —SH | 0.532 (CH₂Cl₂) | Rubbery yellow solid. |
| 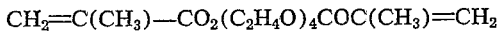 (c) | 20 | Vinyl | 0.164 (CH₂Cl₂) | Viscous brown oil. |

(a) M.P. ca. 86° C. from hydroquinone and acrylyl chloride in benzene solution in the presence of (C₂H₅)₃N. The prepolymer is insoluble in acetone, benzene, chloroform, pyridine and methylene chloride.
(b) The trans form, M.P. ca. 83° C. after recrystallization from heptane. The prepolymer is swelled by benzene, insoluble in acetone.
(c) Diacrylate of the poly-(butylene)glycol available under the tradename Dow Polyglycol B500. n=about 7.

EXAMPLE 4

This example illustrates the prepolymer obtained from the dimethacrylate of tetraethylene glycol, i.e., $$CH_2{=}C(CH_3){-}CO_2(C_2H_4O)_4COC(CH_3){=}CH_2$$

and hydrogen sulfide and describes methods of curing the thiapolyester prepolymer which are of general applicability.

It will be recognized that tetraethylene glycol is generally representative of the series of polyalkylene glycols as described hereinabove and that other such glycols produce prepolymers by the analogous reactions which will be generally similar in kind although differing in degree as by softening temperatures, hydrophilicity, molecular weight, etc.

(A) A solution of 68 parts of the dimethacrylate of tetraethylene glycol and 5 parts of diisopropylamine in 150 parts of pyridine is saturated with hydrogen sulfide, more being added from time to time as needed, and the total uptake is determined. The course of the polymerization is followed by removal of small samples which are precipitated in heptane, washed therewith, dried and the inherent viscosity in chloroform then determined. After 18 days 7.0 parts of hydrogen sulfide are reacted and the polymer has an inherent viscosity in chloroform of 0.473. After about 1 week longer the inherent viscosity has increased to 0.515 and after about a further three month period to 0.608. The polymerization thus has continued on standing. This thiapolyester is a sulfhydryl-terminated, yellow, tacky semi-solid material. In one and one-half After heating for 60 minutes at 385° C. the inherent viscosity in chloroform of the slightly darkened polymer is 0.533. Heating for 1440 minutes results in considerable darkening and apparently in some crosslinking so that the polymer is swollen but not dissolved by chloroform.

(B) The above procedure is repeated using 10 parts of diisopropylamine as catalyst and the course of the reaction is followed as above. After 18 days, 7.1 parts of hydrogen sulfide are taken up and the inherent viscosity of the polymer is 0.260 in chloroform. The reaction mixture is worked up after 15 days and the resultant semi-solid sulfhydryl-terminated monothiapolyester has an inherent viscosity in chloroform of 0.335 which after about three months' standing at room temperature increases to 0.404. Analysis of the sulfydryl-terminated monothiapolyester on isolation and after about three months shows a decrease from about 0.3 percent (corresponding to a molecular weight of about 24,000) to about 0.2 percent of sulfhydryl groups.

A mixture of 5 parts of the above sulfhydryl-terminated monothiapolyester having an inherent viscosity of 0.335, 15 parts of ethyl acrylate, 1 part of glacial acrylic acid and about 0.001 part of bendoin is exposed to a strong source of ultraviolet irradiation to induce free radical polymerization at the acrylate vinyl groups the chains of which terminate by reaction with the sulfhydryl-terminated monothiapolyester. The polymer is precipitated after reaction for about 1 hour and washed with heptane and dried. There is obtained about 7.6 parts of a translucent to opaque, colorless, viscous, cohesive semi-solid block polymer. It has an inherent viscosity in chloroform of 0.415.

The above procedure for formation of a block copolymer is repeated using a mixture of 5 parts of the monothiapolyester, 25 parts of ethyl acrylate and 0.003 part of benzoin and stirring and cooling during irradiation. After 13.5 minutes the reaction mixture is too stiff to stir and the polymer is isolated as above. In this instance over 8 parts of a translucent elastic block copolymer is obtained which has inherent viscosity in chloroform of 0.581.

Another method for curing this thiapolyester is illustrated by reacting 7.12 parts of the thiapolyester with 0.06 part of toluylene diisocyanate, first stirring the reactants together for about 30 minutes at 25° C. and then heating with occasional stirring for 1 hour at 60° C. The resultant cured thiapolyester is much more viscous. It has an inherent viscosity in chloroform of 0.572. It retains terminal sulfhydryl groups, but includes bis-thio-urethane links having the structure:

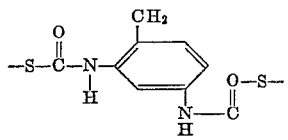

The sulfhydryl-terminated thiapolyester is curable to a rubber, the properties of which are dependent on the amount and nature of the curing agent employed. Trimethylolpropane triacrylate, as curing agent, is mixed with the thiapolyester, diisopropylamine is added as a catalyst and the mixtures as shown in Table 3 are allowed to stand at ordinary temperature for at least one week.

TABLE 3

| Monothia-polyester (parts) | Curing agent (parts) | Catalyst (parts) | Filler* (parts) | Character of product |
|---|---|---|---|---|
| 0.96 | .008 | | | Tacky adhesive adhering to aluminum, removed with cohesive failure. |
| 2.88 | .024 | .02 | | Slightly tacky, extensible rubber. |
| 2.40 | .016 | .02 | | Do. |
| 3.84 | .032 | .05 | 1.55 | Non-tacky, extensible rubber. |

*Carbon black.

(C) A prepolymer of the invention is prepared as above from a solution of 330 parts of the dimethacrylate of tetraethylene glycol and 20 parts of diisopropylamine in 400 parts of pyridine by adding 27 parts of hydrogen sulfide during two days followed by standing for three days and again thoroughly saturated with hydrogen sulfide for two hours. After standing for a further five hours, the highly odorous solution is filtered to remove a yellow crystalline precipitate and precipitated in heptane. The sulfhydryl-terminated yellow tacky solid polymer is dissolved in methylene chloride, reprecipitated and washed with heptane and dried. It then has an inherent viscosity in chloroform of 0.142 and in methylene chloride of 0.124. Analysis shows the presence of 1.6 percent of sulfhydryl groups which corresponds to a number average molecular weight of about 5800 in agreement with the value calculated from the inherent viscosity.

A solution of 10 parts of the above sulfhydryl-terminated monothiapolyester and 2 parts of diethylaminoethyl acrylate in 50 parts of pyridine is permitted to stand at room temperature for about 5 days and the diethylamino-terminated polymer is isolated by precipitation and washing with heptane, followed by drying. The viscous colorless liquid polymer has an inherent viscosity in methylene chloride of 0.870 and contains 0.49 percent of nitrogen. Substantially similar results are obtained when 1 part of acrylamide or about ½ part of ethyl acrylate are employed in place of the above ester, except that the resulting polymer is respectively amide- or ester-terminated.

The following procedure illustrates a cross-linking and curing procedure requiring neither heat nor pressure, and giving a rubbery material.

A mixture of 4.15 parts of the above monothiapolyester, 0.145 part of trimethylolpropane triacrylate and 1.72 parts of carbon black (Philblack 0) is milled together and about 0.1 part of diisopropylamine is milled in. The mixture is molded and cured to form rubber test samples at 25° C. without application of pressure. In eight days it has cured to a tough tack-free rubber having a hardness (Shore Durometer Scale $A_2$) of 65. Testing in an Instron tester shows an elongation of 260 percent at break with tensile strength of 1260 p.s.i. and no set.

(D) The formation of vinyl-terminated thiapolyesters requires a slight deficit in the amount of hydrogen sulfide used, generally of no more than about 5 mole percent as shown in Equation I above. This can be accomplished by permitting the heteropolymerization to proceed past the point where the odor of hydrogen sulfide is no longer evident and then adding an amount of the unsaturated component, but it is preferable to employ a definite, actually measured amount of hydrogen sulfide which is less than that necessary to provide equimolar amounts with the di-unsaturated compound. This procedure and a vinyl-terminated prepolymer of the invention are illustrated by the following preparations:

A solution of 198 parts of tetraethylene glycol dimethacrylate and 15 parts of diisopropylamine in 350 parts of pyridine is repeatedly exposed to hydrogen sulfide during about three days and then permitted to stand for about one day. The total amount of $H_2S$ absorbed is 16.0 parts, as compared to 20.4 parts theoretically absorbable, calculated on the equimolar basis. The thiapolyester is isolated as before by precipitation and washing with heptane and then is further purified by dissolving in methylene chloride followed by reprecipitation and finally drying. The resultant very pale yellow fluid product is a vinyl-terminated thiapolyester polymer and has an inherent viscosity in methylene chloride of 0.076 corresponding to a molecular weight of about 2200 to 2300. It is cured in about one week to tack-free, slightly flexible and extensible crosslinked polymers by reaction of from about 13 to about 8 parts by weight of the thiapolyester with one part by weight of the tetrathioglycolate of pentaerythritol in the presence of about 0.1 part of diisopropylamine. Polymers having greater flexibility and extensibility are obtained by employing vinyl-terminated polyesters having molecular weights of 5000 to 8000 or even higher so that there is a lower density of cross-linking. Somewhat rubbery copolymers of the vinyl-terminated thiapolyester (100 parts) with from 10 to 100 parts of styrene are formed by heating in the presence of 0.5 percent of azobisisobutyronitrile for one hour at 150° F. followed by two hours at 212° F.

EXAMPLE 5

Dimethacrylate and diacrylate esters of polyoxyalkylene glycols are readily prepared when not available commercially under conditions of acid catalysis using toluene to remove water.

In a round-bottom glass flask equipped with stirrer, reflux trap and heater are placed 100 parts of polyoxyethylene glycol having average molecular weight 400, 100 parts toluene, 65 parts methacrylic acid, 0.05 part phenothiazine, and 1.5 parts $H_2SO_4$. The reaction flask is heated and refluxing continued until a total of 9 parts of water has collected in the trap. The reaction mixture is cooled to room temperature and 12 parts of finely pulverized calcium hydroxide are added with continuous agitation to neutralize acid. The resulting slurry is filtered and the filtrate concentrated under reduced pressure to remove toluene. The dimethacrylate ester is obtained in yield of 122 parts, $n_{25}^d$ 1.4645, average molecular weight of 560. The infrared spectrum showed no detectable OH absorption.

In a similar manner from 156 parts of a polyoxyethylene glycol with an average molecular weight of 600 are obtained 176 parts of dimethacrylate ester, $n_{25}^d$ 1.4670, average molecular weight of 723. 250 parts of polyoxyethylene glycol of average molecular weight 1,000 yield 251 parts of dimethacrylate as a waxy solid melting at about 31° C., with average molecular weight of 1,324. Higher polyoxyalkylene glycols are reacted similarly to give higher melting waxy esters.

To a round-bottom glass flask equipped with agitator, reflux condenser and gas inlet tube are added 103 parts of the above dimethacrylate ester of the 400 molecular weight polyoxyethylene glycol, 0.80 parts of triethylene diamine and 0.043 part of phenothiazine. 5.22 parts of $H_2S$ are dissolved in the agitated mixture and agitation is continued while the flask contents are heated to 130° C. and are further held at this temperature for 5 hours. Gaseous $H_2S$ is then added to the agitated flask contents and an excess is maintained for an additional 4 hours. Vacuum is applied for one hour (50 mm. Hg) and then released. Amine is neutralized by 3½ parts of glacial acetic acid and agitation is continued for ½ hour. The liquid product is filtered and has an equivalent weight, on the basis of free SH end groups, of 1,950, corresponding to an average molecular weight of 3,900.

In a similar manner, 160 parts of the above dimethacrylate of 600 molecular weight polyoxyethylene glycol provides a viscous liquid prepolymer with equivalent weight of 2040 (average molecular weight 4080) and the 211 parts of the above dimethacrylate of the 1,000 molecular weight polyoxyethylene glycol are converted to a waxy prepolymer (solid at room temperature) with an equivalent weight of 2210, corresponding to an average molecular weight of 4420.

Dimethacrylates of other polyoxyalkylene glycols are converted to di-SH terminated products as described above. Useful prepolymers are obtained starting with polyoxyethylene glycols with an average molecular weight up to 40,000 or higher. Glycols with an average molecular weight much above about 20,000 tend to give relatively high melting solid prepolymers.

EXAMPLE 6

This example illustrates prepolymers of the invention in which different comonomers are employed such as mixtures of unsaturated monomeric esters with hydrogen sulfide and dithiols.

(A) Gaseous hydrogen sulfide is repeatedly passed into a mixture of 0.13 part of glyceryl diacrylate, 16.5 parts of tetraethylene glycol dimethacrylate, 1 part of diisopropylamine and 40 parts of pyridine for 4 days until 1.7 parts of hydrogen sulfide have been absorbed and a slight excess remains. The product is precipitated and washed with heptane and dried. The resultant sulfhydryl-terminated monothiacopolyester prepolymer is a viscous yellow oil having an inherent viscosity in chloroform of 0.20.

(B) The procedure of part A of this example is repeated employing a solution of 6.6 parts of tetraethylene glycol dimethacrylate, 3.96 parts of tetramethylene glycol diacrylate and 1 part of diisopropylamine in 40 parts of pyridine. After 20 days, 1.4 parts of hydrogen sulfide are absorbed and the sulfhydryl-terminated thiacopolyester is isolated as above as a viscous yellow liquid having inherent viscosity in chloroform of 0.136. Ethylene glycol diacrylate is used similarly to produce a copolymer.

The thiacopolyesters thus produced are broadly applicable in the fields of utility of the thiapolyesters and have the additional advantage that alterations in properties are more readily possible using such mixtures of readily available monomers than by the special synthesis of particular less accessible monomers.

EXAMPLE 7

This example illustrates the production and utility of prepolymers of the invention having a predetermined degree of branching. Such products are formed when thiacopolyesters are produced using mixtures of di- and tri-unsaturated monomers in suitable amounts, but somewhat greater control of the degree of branching is obtained by first preparing a suitable linear thiapolymer and then reacting it with less than the stoichiometric equivalent of the selected branching agent. The converse reactions are also effective and numerous suitable branching agents are listed hereinabove. By this means a thiacopolyester is produced having relatively long unbranched portions of substantially equal average length with the individual branchings relatively evenly spaced in the molecule of the prepolymer. These prepolymer molecules may then be described as having a reticulate structure, it being understood that not all molecules will necessarily include large closed rings. The structures, when a triunsaturated branching agent is employed, may be visualized as analogous to pieces of chicken wire with approximately hexagonal interstices, cut into small segments; some pieces will include the original interstices and other pieces will include only portions of the boundaries of interstices but will have numerous ends. A similar analogy will serve to visualize the types of structures when other branching agents are employed. It will be evident that the fully cross-linked or cured polymer is thus analogous to a large piece of the wire if it is planar, or a more complicated 3-dimensional reticulate structure when cross-linking occurs between various segments.

Two sulfhydryl-terminated mono-thiapolyesters hereafter designated lot X and lot Y are prepared from tetraethylene glycol dimethacrylate by repeating the procedure described in part C of Example 4 except that the polymerization mixture in the case of thiapolymer lot X is permitted to stand for about 1 day after addition of 27 parts of hydrogen sulfide, while that in the case of thiapolymer lot Y stands for about 3 days. Thiapolymers lot X and lot Y have inherent viscosities in chloroform of 0.111 and 0.128 respectively and contain 2.2 percent and 1.6 percent of sulfhydryl groups respectively.

It will be noted that the duration of reaction, other conditions being constant, determines the molecular weight of the prepolymer product. Shorter times result in lower molecular weights as evidenced by inherent viscosities and higher content of sulfhydryl groups.

The two thiapolymers lot X and lot Y are selectively branched by reaction with triacrylyl-hexahydro-s-triazine in pyridine in the presence of diisopropylamine and are isolated by the procedure described above in connection with the unbranched prepolymers, by precipitation in and washing with heptane followed by drying. The conditions of reaction, the number of parts of each reactant employed and the properties of the resultant, selectively branched, light yellow liquid thiapolymers are indicated in the following table.

TABLE 5

| Thiapolymer used | Lot X | Lot X | Lot Y |
|---|---|---|---|
| Parts of thiapolymer | 100 | 125 | 331 |
| Parts of branching agent | 1.78 | 2.60 | 5.75 |
| Diisopropylamine (catalyst) | 2.0 | 3.0 | 10.0 |
| Pyridine (solvent) | 120 | 200 | 400 |
| Reaction time (hours) | 18 | 120 | 18 |
| Product designation | Lot XA | Lot XB | Lot YA |
| Percent SH in product | 1.3 | 1.1 | 0.9 |
| η in chloroform | 0.186 | | 0.272 |

The curing of these selectively branched thiapolymers leads to products having properties depending upon the method and materials employed for curing. Thus, lot XA is cured to a tack-free rubbery material in 4 days at room temperature by reaction of 100 parts thereof with 1 part of tris(dimethylaminemethyl)phenol and 6 parts of zinc peroxide. It is cured to a tack-free rubber in 4 hours at 60° C. when 100 parts are mixed with 10 parts of tris(dimethylaminomethyl)phenol and 50 parts of a liquid epoxy resin polymer (Epon 828) derived from bisphenol-A.

Another sulfhydryl-terminated mono-thiapolyester, designated lot Z, is prepared as above and has inherent viscosity 0.10 and sulfhydryl content of 2.2 percent. Branching is introduced by reaction for 23 hours at 25° C. of 1300 parts of thiapolyester with 38 parts of trimethylolpropane triacrylate in 1600 parts of pyridine containing 20 parts of diisopropylamine. The branched prepolymer is precipitated in and washed with heptane, redissolved in methylene chloride and again precipitated and washed with heptane. Drying gives a viscous, yellow, liquid, sulfhydryl-terminated, branched thiacopolyester prepolymer with inherent viscosity in chloroform of 0.21 and sulfhydryl content of 1.2 percent.

EXAMPLE 8

This example illustrates a branched prepolymer formed by reaction of two sulfhydryl compounds simultaneously.

A mixture of 6.8 parts of pentaerythritol tetrathioglycolate, 330 parts of tetraethylene glycol dimethacrylate, 400 parts of pyridine, 0.5 part of di-tert-amylhydroquinone, and 20 parts of diisopropylamine are stirred and hydrogen sulfide is introduced periodically in small increments during three days until 27 parts of hydrogen sulfide has been absorbed. Hydrogen sulfide is then bubbled through the mixture for two hours and the mixture, after standing at 25° C. for a further five hours, is filtered and poured into heptane. The precipitated polymer is

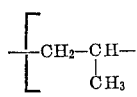

washed with heptane, redissolved in methylene chloride, and reprecipitated in heptane. Washing with heptane and drying in vacuo gives the branched sulfhydryl-terminated thiacopolyester prepolymer as a viscous, yellow liquid containing 2.2 percent of sulfhydryl groups and with inherent viscosity in chloroform of 0.112.

EXAMPLE 9

This example illustrates prepolymers of the invention in which dithiols are employed. All reactions are carried out in sealed vessels at 50° C. using the proportions indicated in the table. The prepolymers are characterized by their inherent viscosities determined in chloroform except for run 5 which is determined in pyridine.

TABLE 6

| Run | 1 | 2 | 3 |
|---|---|---|---|
| Ethanedithiol | 1.90 | | |
| 1,4-butanedithiol | | 2.45 | |
| Diethylene glycol dithioglycolate | | | 7.63 |
| Tetraethylene glycol dimethacrylate | 6.80 | 6.80 | 9.90 |
| Pyridine | 15 | 15 | 25 |
| Diisopropylamine | 0.5 | 0.5 | 0.3 |
| Reaction time (in days) | 10 | 10 | 4 |
| Inherent viscosity of thiapolymer | 0.135 | 0.091 | 0.121 |

Other acrylate components as employed with $H_2S$ are employed similarly.

What is claimed is:

1. A substantially linear viable thiapolyester having predetermined reactive terminal groups selected from the class consisting of sulfhydryl and vinyl groups, and consisting essentially of a plurality of recurring units represented by the formula:

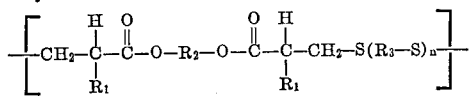

wherein $R_1$ represents a member of the group consisting of hydrogen and methyl radicals, $R_2$ represents a divalent radical of the group consisting of cycloalkylene of 6 to 8 carbon atoms, arylene of 6 to 10 carbon atoms, oxaalkylene having molecular weights in the range of about 100 up to about 40,000 in which carbon and oxygen are in a ratio from 2:1 to 4:1, $n$ is an integer from 0 to 1 and $R_3$ is a divalent organic radical selected from the group consisting of alkylene, arylene, aralkylene, diacycloxyalkylene and acylamide radicals, both terminal groups of said polymer being identical and capable of further reaction.

2. A substantially linear viable thiapolyester according to claim 1 consisting essentially of a plurality of recurring units represented by the formula:

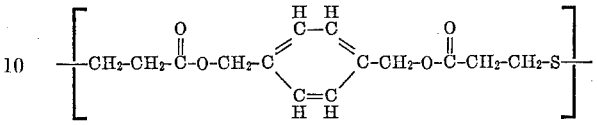

terminal groups of said polymer being identical and capable of further reaction.

3. A substantially linear viable thiapolyester according to claim 1 consisting essentially of a plurality of recurring units represented by the formula:

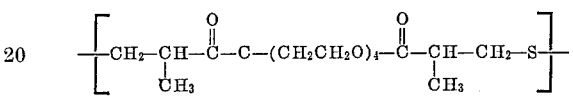

both terminal groups of said polymer being identical and capable of further reaction.

4. A substantially linear viable thiapolyester according to claim 1 consisting essentially of a plurality of recurring units represented by the formula:

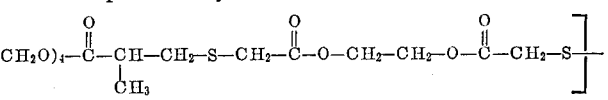

both terminal groups of said polymer being identical and capable of further reaction.

5. A substantially linear viable thiapolyester according to claim 1 additionally containing, in minor amount, recurring units of the formula:

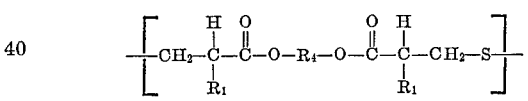

wherein $R_1$ represents a member of the group consisting of hydrogen and methyl groups and $R_4$ is a divalent radical of the group consisting of alkylene of 2 to 4 carbon atoms and glyceryl; terminal groups of said thiapolyester being identical and capable of further reaction.

6. A substantially linear viable copolymer according to claim 5 consisting essentially of a plurality of randomly interspersed recurring units represented by the formulae:

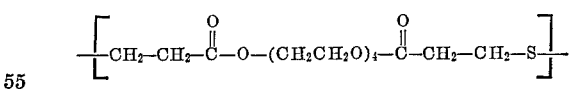

and

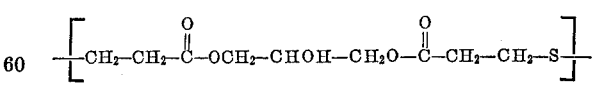

the terminal groups of said polymer being identical and capable of further reaction.

7. A substantially linear viable thiapolyester according to claim 1 additionally containing no more than about one in ten recurring units of branching agent represented by the formula:

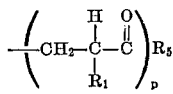

wherein $p$ is 3 or 4, $R_1$ is hydrogen or methyl and $R_5$ is a 3- or 4-valent 3- to 6-carbon acyclic organic or triazine nucleus adapted to forming chemical junctions to sulfur atoms of recurring units represented by the formula:

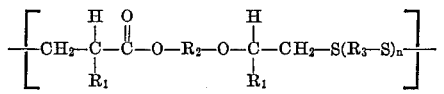

wherein $R_1$ represents a member of the group consisting of hydrogen and methyl radicals, $R_2$ represents a divalent radical of the group consisting of cycloalkylene of 6 to 8 carbon atoms, arylene of 6 to 10 carbon atoms, oxaalkylene having molecular weights in the range of about 100 up to about 40,000 in which carbon and oxygen are in a ratio from 2:1 to 4:1, $n$ is an integer from 0 to 1 and $R_3$ is a divalent organic radical selected from the group consisting of alkylene, arylene, aralkylene, diacyloxyalkylene and acylamide radicals, terminal groups of said polymer being identical and capable of further reaction.

References Cited
UNITED STATES PATENTS 2,759,913   8/1956   Hulse _____ 260—79
3,278,352   10/1966   Erickson _____ 260—79

DONALD E. CZAJA, *Primary Examiner.*

M. I. MARQUIS, *Assistant Examiner.*